Figures 1, 2, 3, 4, 5, 6, 7, 8:
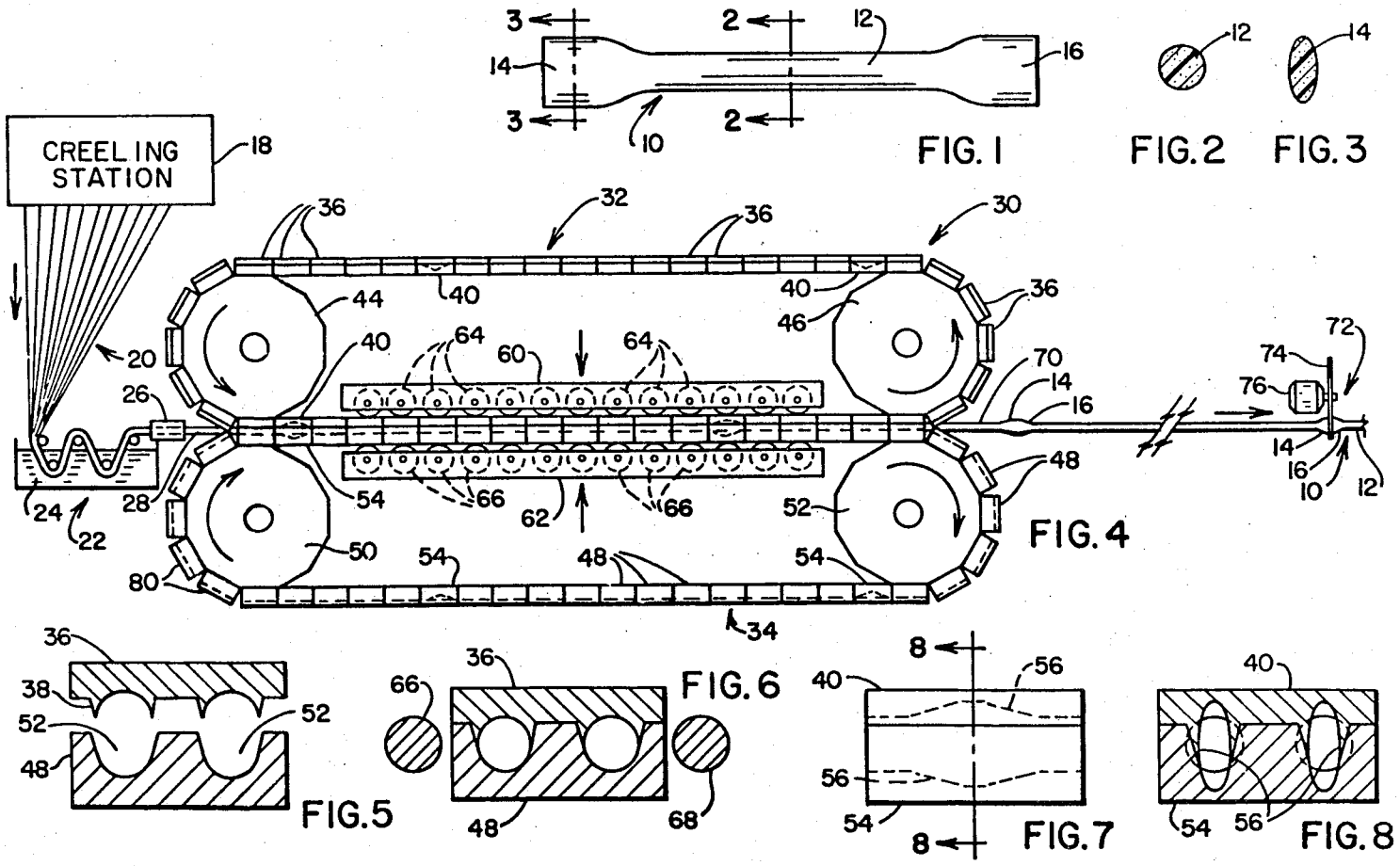
Figure 9:
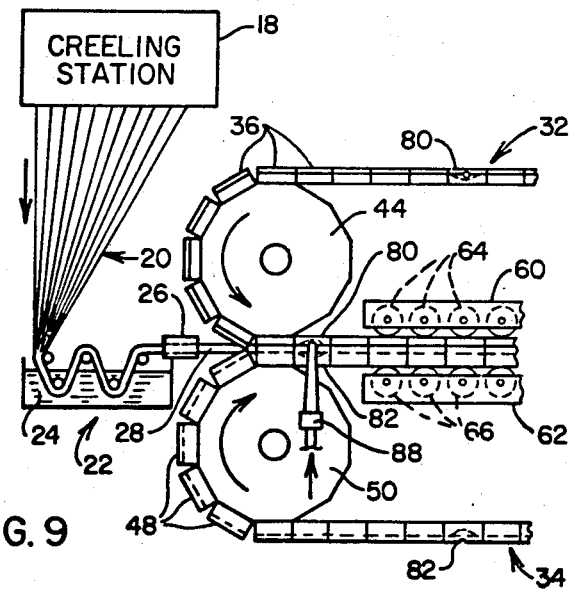
Figure 10:
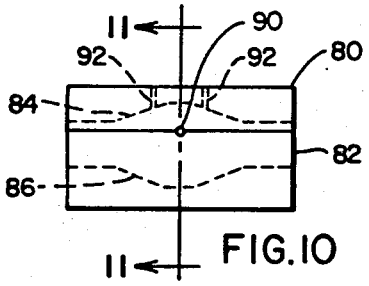
Figure 11:
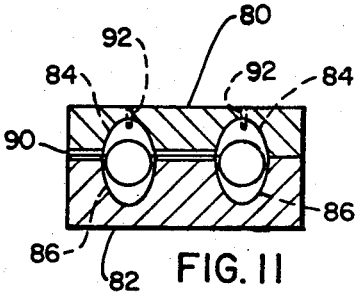

United States Defensive Publication [19] (H) [11] T101,401

Zion [43] Jan. 5, 1982

[54] PROCESS AND APPARATUS FOR FORMING ELONGATE GLASS FIBER REINFORCED PRODUCTS

[76] Inventor: Earl M. Zion, 1138 Pierson Dr., Newark, Ohio 43055

[21] Appl. No.: 174,097

[22] Filed: Jul. 31, 1980

Related U.S. Application Data

[63] Continuation of Ser. No. 12,253, Feb. 15, 1979, abandoned.

[51] Int. Cl.[3] ..... B29D 3/02; B32B 17/04; B32B 17/10

[52] U.S. Cl. ..... 264/25; 156/166; 156/180; 156/244.12; 156/433; 156/441; 264/137; 264/148; 264/174; 264/176 R; 425/224; 425/289; 425/378 R; 425/505; 425/510

[57] ABSTRACT

The process and apparatus for continuously forming glass fiber reinforced products employs a preform produced by drawing continuous glass fibers through a resin bath and stripping die. This preform is then compressed during passage through an elongate molding zone. The molding zone is formed of two, articulated die cavity-containing tracks, the individual mold components of which join at the threshold of the zone to form an elongate, moving compression stage. This stage may be heated to carry out curing of the product during compression thereof.

1 Claim, 2 Sheets Drawing,

19 Pages Specification

The file of this unexamined application may be inspected and copies thereof may be purchased (849 O.G. 1221, Apr. 9, 1968).

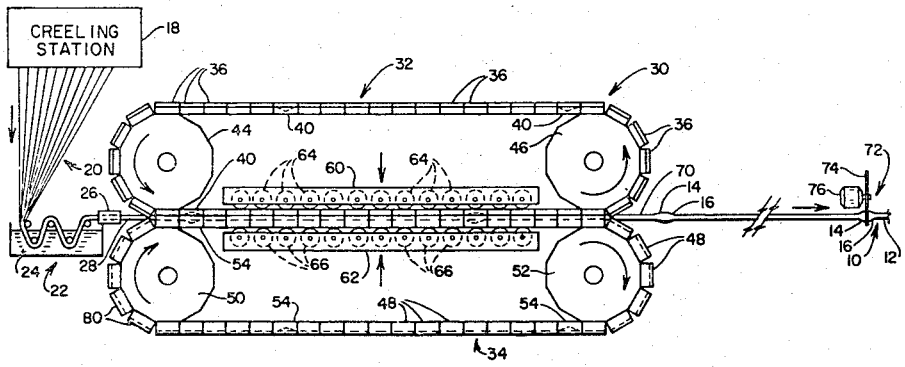

CREELING STATION